J. R. MOFFITT.
Skiving-Machine.

No. 213,521. Patented Mar. 25, 1879.

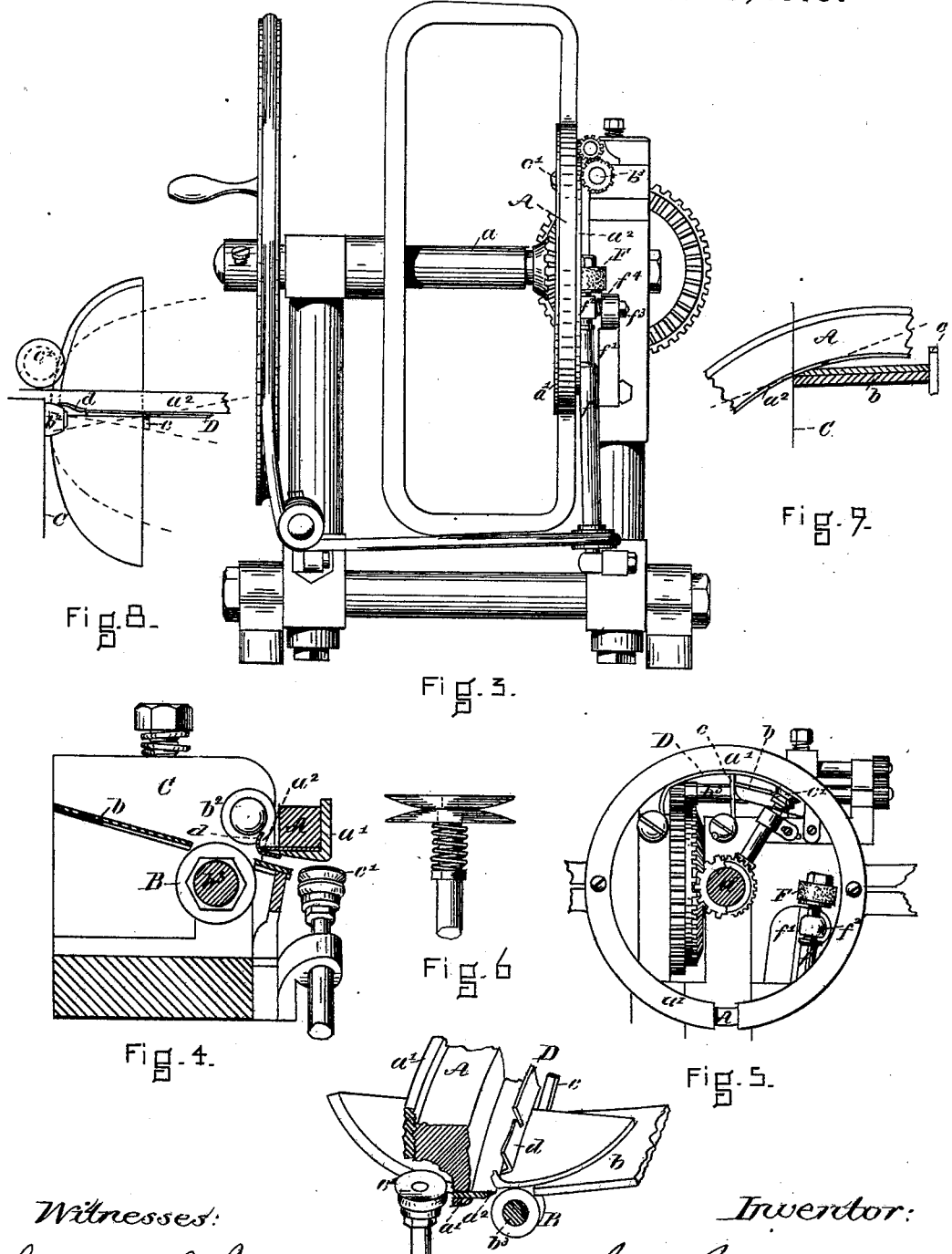

UNITED STATES PATENT OFFICE.

JOHN R. MOFFITT, OF BOSTON, MASSACHUSETTS.

IMPROVEMENT IN SKIVING-MACHINES.

Specification forming part of Letters Patent No. 213,521, dated March 25, 1879; application filed June 12, 1878.

*To all whom it may concern:*

Be it known that I, JOHN R. MOFFITT, of Boston, in the county of Suffolk and State of Massachusetts, have invented an Improved Skiving-Machine, of which the following is a full, clear, concise, and exact description, reference being had to the accompanying drawings, making a part hereof.

Figure 1:
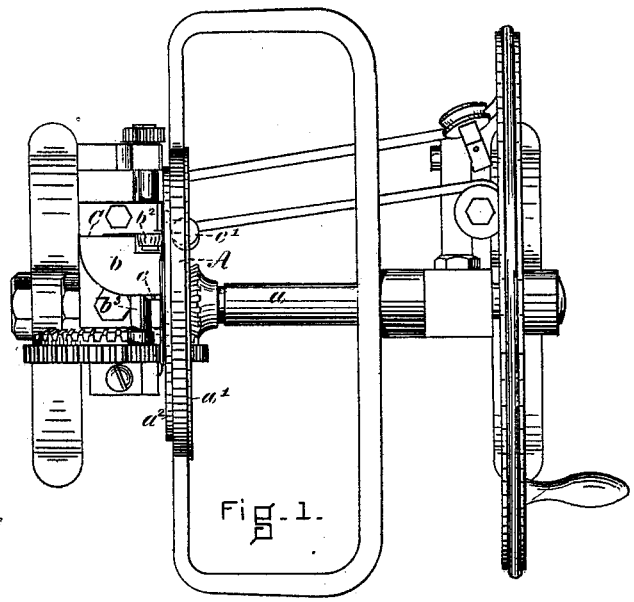
Figure 2:
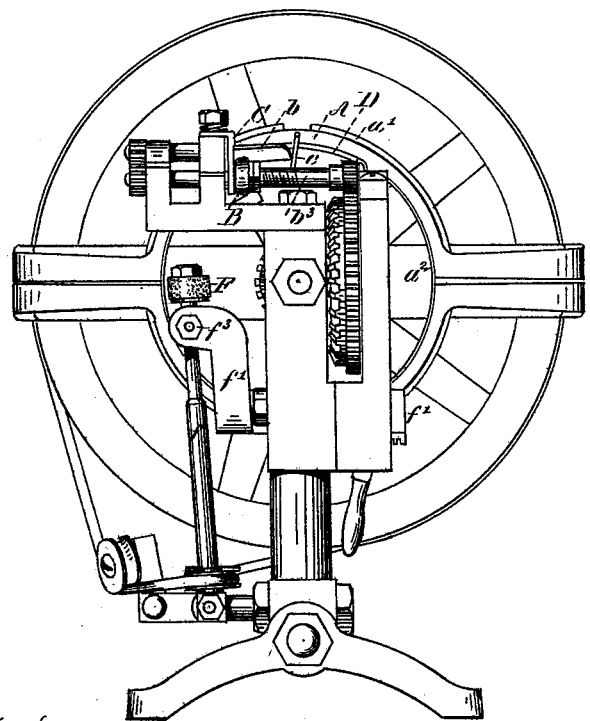

In the drawings, Figure 1 is a plan, Fig. 2, an end elevation, and Fig. 3 a side elevation, showing a machine embodying all parts of my invention. The other figures show details.

The main feature of my invention consists in the combination of a cylindrical knife with mechanism for supporting and feeding the material to be skived, and with an edge-guide, the purpose being to produce a machine for rapidly skiving counters and like articles by a draw-cut.

Various skiving-machines are well known; but I am the first, so far as I have any reason to believe, to combine a cutter having a blade substantially cylindrical with mechanism for supporting and feeding the blank and an edge-guide, the relation between the surface of the support and the knife-edge determining the amount skived off, and the edge-guide acting, in conjunction with the knife-blade, the feed, and the support, to insure that the amount skived off shall be taken off from precisely the proper parts of the blank, the rotation of the knife also tending to hold the blank against the edge-guide. The blank to be skived is also so firmly held by the feed-rolls near the cutting-edge, and the cutting-edge moves between them so close up to that part of the blank which is firmly held, that the cut is smooth, and the knife-edge offers very little resistance to the feed.

Another important feature of my invention relates to a new method of preparing counter-blanks and other articles which require skiving at the edge; and consists in, first, skiving the edge, and then burnishing the skived edge, or rubbing it down with a rapidly-moving smooth metal surface, by which the skived edge is smoothed and hardened, and, in counters, made much more suitable for its purpose.

The other features of my invention relate to certain devices, fully described below, more especially applicable in a machine for skiving blanks for the counters of boots and shoes, that being the primary object of the machine shown in the drawings, although its features are the same, in substance, as would be used in machines for skiving other articles along an edge.

The knife shown is, so far as it is new, the subject-matter of a patent recently granted to me, and nothing is here claimed therefor relating to its construction.

In the drawings, A is a knife-holder, fast upon the shaft $a$, so that it revolves with that shaft. $a^1$ is a ring, which serves to hold the knife-blade $a^2$ to the holder A, and to adjust the position of the knife-blade on the holder A.

The support B is in such relation to the edge of the knife and the edge-guide C that the material fed between the support and the knife while the knife revolves, with the edge of the material against the edge-guide, will have its surface next the knife cut away, the amount of cut depending upon the relative arrangement of the surface of the support, the cutting-edge of the knife, and the edge-guide.

For convenience in feeding, a table, $b$, is used around the support B, and a feed-roll, $b^2$, acts in conjunction with the support B. The support B, in the machine shown, is mounted upon a shaft, $b^3$, so that it can be adjusted lengthwise on that shaft, and thereby alter the relation between its surface and the knife-edge. This support may, of course, be stationary, instead of forming part of the feed, and instead of two feed-rolls any other suitable feed may be used.

An edge-guide, C, in front of the knife-edge, guides the edge of the counter-blank between the feed-rolls B $b^2$, and these rolls feed the blank forward against the knife-edge, the lower roll, B, or a portion of the table, $b$, supporting the blank in proper relation to the knife-edge, and the motion of the knife aiding the feed to keep the edge of the blank against the knife-edge.

When the blank is first inserted in skiving its curved edge, one corner of it is caught by the feed, and its straight part rests against the spring-guide $c$. The curved edge is kept close against the edge-guide C, the blank swinging on the spring-guide $c$. As the blank is fed through, its curved edge strikes the edge-guide $c'$ immediately after it is skived, this guide $c'$ being adjusted as close as possible to the knife, and also in such relation to the line of feed that the skived edge of the blank is forced against the edge-guide $c'$, and consequently the blank is gradually swung around until its curved edge is skived.

The spring-guide $c$ is not necessary in skiving the curved edge of the counter; but this operation is made somewhat more certain by that guide. The main use of this guide $c$, however, is in skiving the straight side of the counter-blank, as will now be explained. The counter-blank is fed in with its straight side in contact with the edge-guide C, and the guide $c'$ is set so that the straight edge of the blank will be fed past it, but will not press against it sufficiently to change the direction of the motion of the blank. The spring-guide $c$ yields as the wider parts of the blank pass between it and the guide C, and thus aids to keep the straight edge of the blank close against the guide C.

The guide $c'$, when formed, as shown, with a deep groove around it, and mounted upon a shaft, so that it revolves rapidly, constitutes, in addition to its function as a guide, a burnisher for smoothing and hardening the skived edge; and this is also a valuable feature of my invention. Instead of a solid disk with a groove around it, I sometimes use two disks, as in Fig. 6, pressed together by a spring.

D is a spring, which bears at its free end a presser, $d$, which presses upon the counter close up to the knife-edge, its function being to press the counter-blank upon its support and insure its being skived properly.

By the use of the presser $d$ the blank is pressed closely against the support B, not only at a distance from the knife-edge, but close up to it, say within a sixteenth of an inch.

F is an emery-wheel, mounted upon a shaft, $f$. This shaft is journaled in a box, $f^2$, connected to a slide, $f^1$. By this slide $f^1$ the wheel F can be moved toward and from the flat part of the knife-blade. The slide is moved as shown, or in any other suitable manner.

The box $f^2$ is connected to the slide $f^1$, as shown, in order that the wheel F may be adjusted in proper relation to the edge of knife-blade by turning the nut $f^3$, which, in connection with spring $f^4$, will move the wheel F nearer to or farther from the slide $f^1$. In this way the emery-wheel is capable of being moved in two directions—one to adjust it accurately, so that when it is brought into use it will act upon exactly the right part of the knife, (which is the motion above spoken of as nearer to or farther from the slide $f^1$, given by turning the nut $f^3$,) and the other to bring it into and throw it out of use, which is the motion given by the slide $f^1$.

I am aware of the Patents Nos. 152,732, of 1874, and 161,858, of 1875; but in both the plane of the material to be cut is substantially at right angles with the acting part of knife-edge, so that the knife-edge cuts across the material—that is, turns it and does not skive it. Neither of these machines is capable of use as a skiver. In both of them the sole or heel is brought to the proper shape from the rough—that is, its outline is changed by cutting off portions of its edge; while in my machine the outline of the blank is not changed, but the thick edges of the blank are thinned. I disclaim, therefore, all the features of those machines.

What I claim as my invention is—

1. In a skiving-machine, the combination of the cylindrical knife, the mechanism for supporting and feeding the blank to be skived, and the edge-guide C, substantially as described.

2. In combination, the cylindrical knife and the rolls B $b^2$, arranged together as shown.

3. The improvement in the art of preparing counter-blanks and like articles, consisting in first skiving the edge, and then smoothing and hardening the skived edge by subjecting it to a rapidly-moving smooth surface, substantially as described.

4. The burnisher $c'$, having an angular groove around its periphery, as described, in combination with the feed B $b^2$, for subjecting the skived edge of the blank to the action of the burnisher, all substantially as described.

5. The spring-guide $c$, in combination with the edge-guide C and the feed B $b^2$, substantially as described.

JOHN R. MOFFITT.

Witnesses:
J. E. MAYNADIER,
GEORGE O. G. COALE.